United States Patent
Raasakka et al.

(10) Patent No.: US 9,705,560 B1
(45) Date of Patent: Jul. 11, 2017

(54) DISCRETE FOURIER TRANSFORM USING GNSS TRACKING CHANNEL

(71) Applicant: Honeywell International Inc., Morris Plains, NJ (US)

(72) Inventors: Jussi Raasakka, Brno (CZ); Ondrej Kutik, Brno (CZ); Martin Orejas, Brno (CZ); Jakub Skalicky, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/078,278

(22) Filed: Mar. 23, 2016

(51) Int. Cl.
- *H04L 27/14* (2006.01)
- *H04L 27/16* (2006.01)
- *H04L 27/22* (2006.01)
- *H04B 1/7085* (2011.01)
- *H04L 27/00* (2006.01)

(52) U.S. Cl.
CPC ....... *H04B 1/7085* (2013.01); *H04L 27/0002* (2013.01); *H04B 2201/7073* (2013.01)

(58) Field of Classification Search
CPC .......... H04B 1/7085; H04B 2201/7073; H04L 27/0002; G01S 19/254
USPC ................ 375/326, 327, 343, 260, 316, 150
See application file for complete search history.

(56) References Cited

U.S. PATENT DOCUMENTS

| | | |
|---|---|---|
| 8,390,513 B2 | 3/2013 | Young |
| 9,124,356 B2 | 9/2015 | Gunawardena et al. |
| 2011/0007783 A1* | 1/2011 | Weill ............... G01S 19/254 375/150 |

FOREIGN PATENT DOCUMENTS

EP  2326022  5/2011

OTHER PUBLICATIONS

Pullen et al., "GNSS Jamming in the Name of Privacy: Potential Threat to GPS Aviation", InsideGNSS, Mar.-Apr. 2012, pp. 34-43, Publisher: www.insidegnss.com, Published in: US.

* cited by examiner

*Primary Examiner* — Phuong Phu
(74) *Attorney, Agent, or Firm* — Fogg & Powers LLC

(57) ABSTRACT

A method of performing a discrete Fourier transform (DFT) on one or more data samples in a global navigation satellite system baseband tracking channel is provided. The method comprises loading a pseudorandom noise code generator with a constant value in the baseband tracking channel; setting a tracking loop integration time according to a selected frequency resolution; updating a carrier generator with a selected DFT frequency in the baseband tracking channel; integrating a data sample in the baseband tracking channel; and storing the integrated data sample in a DFT bin. The method determines whether all DFT bins have been received, and if all DFT bins have not been received, the method repeats starting with updating the carrier generator, until all DFT bins have been received.

19 Claims, 3 Drawing Sheets

DISCRETE FOURIER TRANSFORM USING GNSS TRACKING CHANNEL

BACKGROUND

The current Global Navigation Satellite System (GNSS) receiver acquisition and tracking functions are vulnerable due to the extreme low Signal-to-Noise Ratio (SNR) on which the satellite signals are received. The degradation of GNSS signals can occur due to many reasons. For example, the satellite signals can be attenuated due to shadowing, or an intentional or unintentional interference can bury the signals under interference.

Especially for aviation GNSS receivers, the integrity monitoring of GNSS signals is one of the most important and challenging tasks. The current integrity monitoring scheme for an aviation GNSS receiver assumes that there is no interference present at the input to the GNSS receiver. However, there have been several reported incidents where this assumption did not hold. This can lead to overoptimistic estimation of pseudorange errors and cause severe problems in maintaining the required integrity and accuracy levels.

A significantly large number of signals from different satellite constellations and frequencies will be available for future Multi-Constellation Multi-Frequency (MCMF) GNSS receivers. This will provide future receivers with considerable flexibility when selecting which signals to include for the position and velocity computations, for example, by selecting signals that are not being affected by external interference. Alternatively, the receiver can de-weight signals when it detects the signals are being subjected to interference. Interference awareness is also the first step of interference mitigation.

Signal monitoring requires different techniques in order to detect whether external interference is degrading the GNSS receiver performance. One way to monitor the quality of the incoming data from the Radio Frequency Front End (RF-FE) is to transform the data into frequency domain and to look for any anomalies. Typically, many interference sources, such as harmonics from other transmitters, are clearly visible in the frequency domain, which makes the signal quality monitoring much easier.

The most common technique to perform this type of spectrum monitoring is to have a dedicated Fast Fourier Transform (FFT) engine designed to do the translation of the incoming samples into the frequency domain. However, this approach needs additional design and verification efforts, which will lead to larger designs with increased recurring and non-recurring costs.

SUMMARY

A method of performing a discrete Fourier transform (DFT) on one or more data samples in a GNSS baseband tracking channel is provided. The method comprises loading a pseudorandom noise code generator with a constant value in the baseband tracking channel; setting a tracking loop integration time according to a selected frequency resolution; updating a carrier generator with a selected DFT frequency in the baseband tracking channel; integrating a data sample in the baseband tracking channel; and storing the integrated data sample in a DFT bin. The method determines whether all DFT bins have been received, and if all DFT bins have not been received, the method repeats starting with updating the carrier generator, until all DFT bins have been received.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system are disclosed that provide information on the frequency content of one or more radio frequency front end (RF-FE) signals by performing a Discrete Fourier Transform (DFT) on the incoming RF data samples utilizing one or more Global Navigation Satellite System (GNSS) baseband tracking channels found in typical GNSS receivers. The present method and system for performing a DFT employs tracking control software that interacts with various signal processing blocks in the GNSS receiver tracking channel to calculate each new DFT point from a different set of data.

By utilizing the GNSS tracking channel to perform the DFT, no additional hardware resources are required. This leads to a less complex design and cost savings. Moreover, signal monitoring can be implemented in existing GNSS receivers by a simple software upgrade.

The DFT is defined by the following equation (1):

$$F_n \equiv \sum_{k=0}^{N-1} f_k e^{-2\pi i n k / N}$$

where n is the number of the DFT bin, k is the number of the input sample, $F_n$ is the result of the $n^{th}$ DFT bin, $f_k$ is the $k^{th}$ input sample, and N is the transform length.

The implementation of the present method and system for performing a DFT is described as follows with reference the drawings.

Figure 1:
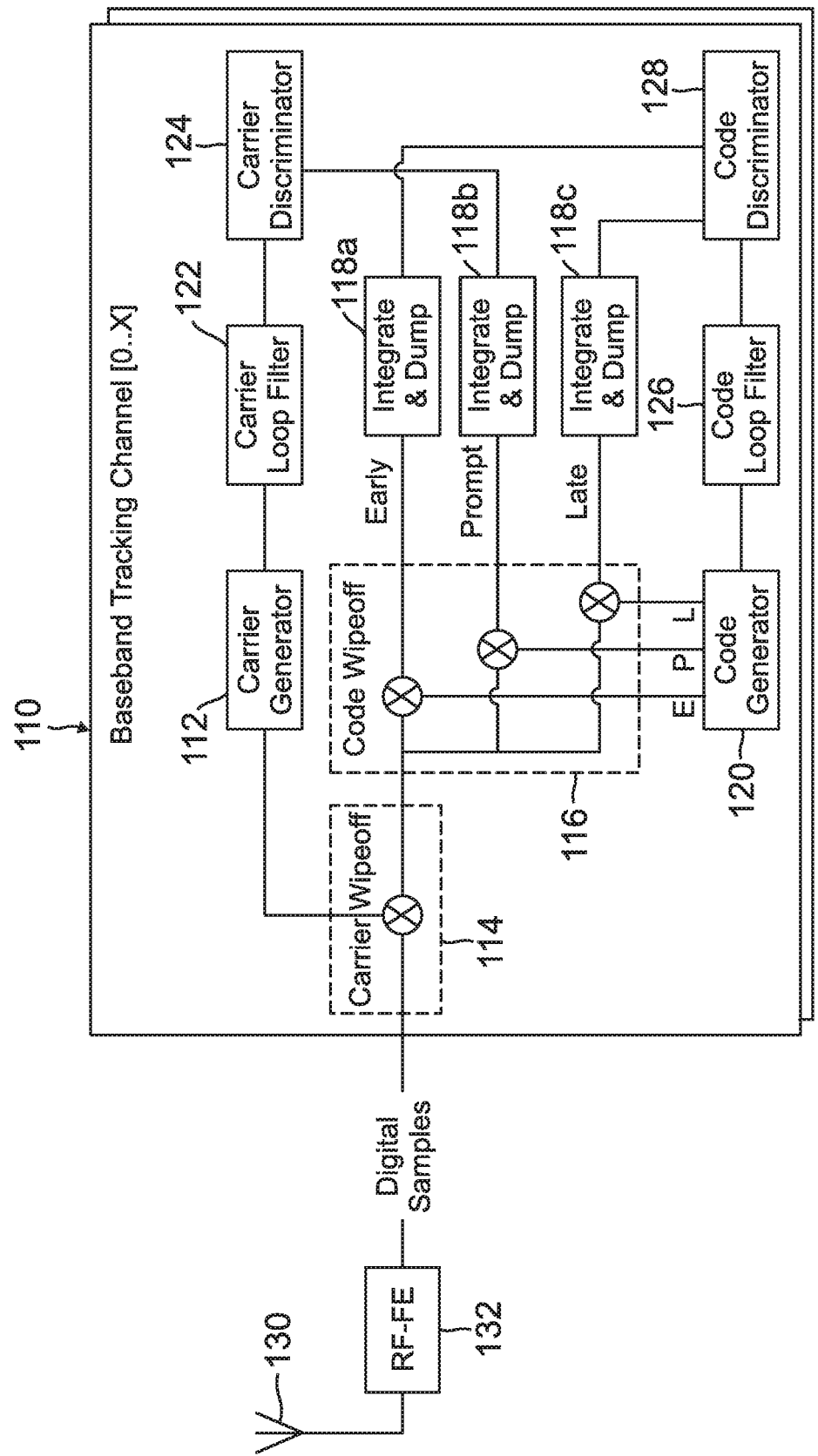
FIG. 1 is a block diagram of a typical baseband tracking channel for a GNSS receiver.

FIG. 1 is a block diagram of a typical baseband tracking channel(s) 110 in a GNSS receiver. The baseband tracking channel 110 includes various signal processing blocks, including a carrier generator 112 such as a carrier numerically controlled oscillator (NCO), a carrier wipeoff 114 (for multiplication with complex phases) is configured to receive an output signal from carrier generator 112, and a code wipeoff 116 configured to receive an output signal from carrier wipeoff 114. A set of integrate/dump accumulators 118a-118c is configured to accumulate early (E), prompt (P) and late (L) codes from code wipeoff 116. A code generator 120 is configured to send pseudorandom noise (PRN) codes (E, P, and L) to code wipeoff 116.

The baseband tracking channel 110 further includes a carrier loop filter 122 operatively coupled with carrier generator 112, and a carrier discriminator 124 operatively coupled with carrier loop filter 122 and integrate/dump accumulator 118b. A code loop filter 126 is operatively coupled with code generator 120, and a code discriminator 128 is operatively coupled with code loop filter 126 and integrate/dump accumulators 118a and 118c.

During operation, an antenna 130 transmits RF signals to an RF-FE 132, which is configured convert the RF signals to digital samples. The RF-FE then sends the digital samples to carrier wipeoff 114 in baseband tracking channel 110 for processing.

Figure 2:
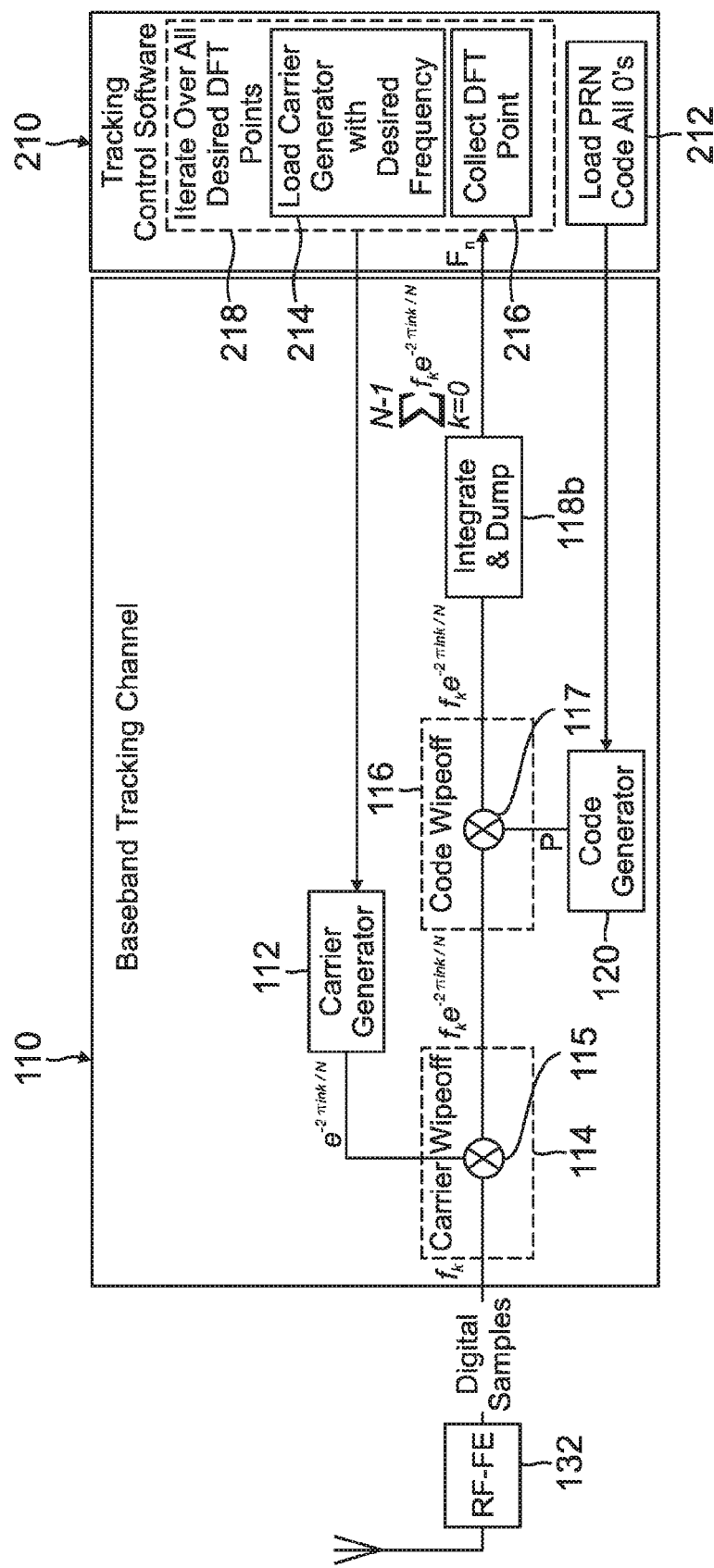
FIG. 2 is a block diagram of a Discrete Fourier Transform (DFT) implementation using a single baseband tracking channel of a GNSS receiver according to one embodiment.

FIG. 2 is a block diagram of a DFT implementation using a single baseband tracking channel 110 in the GNSS receiver according to one embodiment. Only the signal processing blocks of baseband tracking channel 110 used in generating the DFT are depicted. The various components of equation (1) are shown in FIG. 2 to indicate how the final DFT equation is built using the signal processing blocks. It should be noted that code generator 120 and code wipeoff 116 are not required for the transformation, but are left in FIG. 2 as they are present in the physical GNSS tracking channel. Similarly, the outputs of the early and late accumulators (118a and 118b in FIG. 1) are not used for the DFT computation.

As shown in FIG. 2, baseband tracking channel 110 is in operative communication with a tracking control software module 210. The baseband tracking channel 110 can be implemented in a field programmable gate array (FPGA) or an application-specific integrated circuit (ASIC), for example.

The tracking control software module 210 includes processor executable instructions for loading a PRN code of a constant value such as all zeros (block 212) into code generator 120 in baseband tracking channel 110. In addition, tracking control software module 210 includes processor executable instructions for loading carrier generator 112 with a desired frequency (block 214) and collecting a DFT point (block 216) from integrate/dump accumulator 118b, which are iterated over all desired DFT points (block 218).

As depicted in FIG. 2, after carrier generator 112 is loaded with the desired frequency, an output signal ($e^{-2\pi i n k/N}$) is sent from carrier generator 112 to carrier wipeoff 114, which also receives input digital samples ($f_k$) from RF-FE 132. A mixer 115 in carrier wipeoff 114 combines the output signal from carrier generator 112 and the input digital samples, and sends the combined signal ($f_k e^{-2\pi i n k/N}$) to code wipeoff 116, which also receives a P code from code generator 120. A mixer 117 in code wipeoff 116 sends the combined signal ($f_k e^{-2\pi i n k/N}$) to integrate/dump accumulator 118b, which outputs an integrated result ($\sum_{k=0}^{N-1} f_k e^{-2\pi i n k/N}$) to tracking control software module 210. The integrated result is collected as a DFT point ($F_n$) at block 216 in tracking control software module 210. The foregoing process is then repeated until all desired DFT points are collected in DFT bins.

Figure 3:
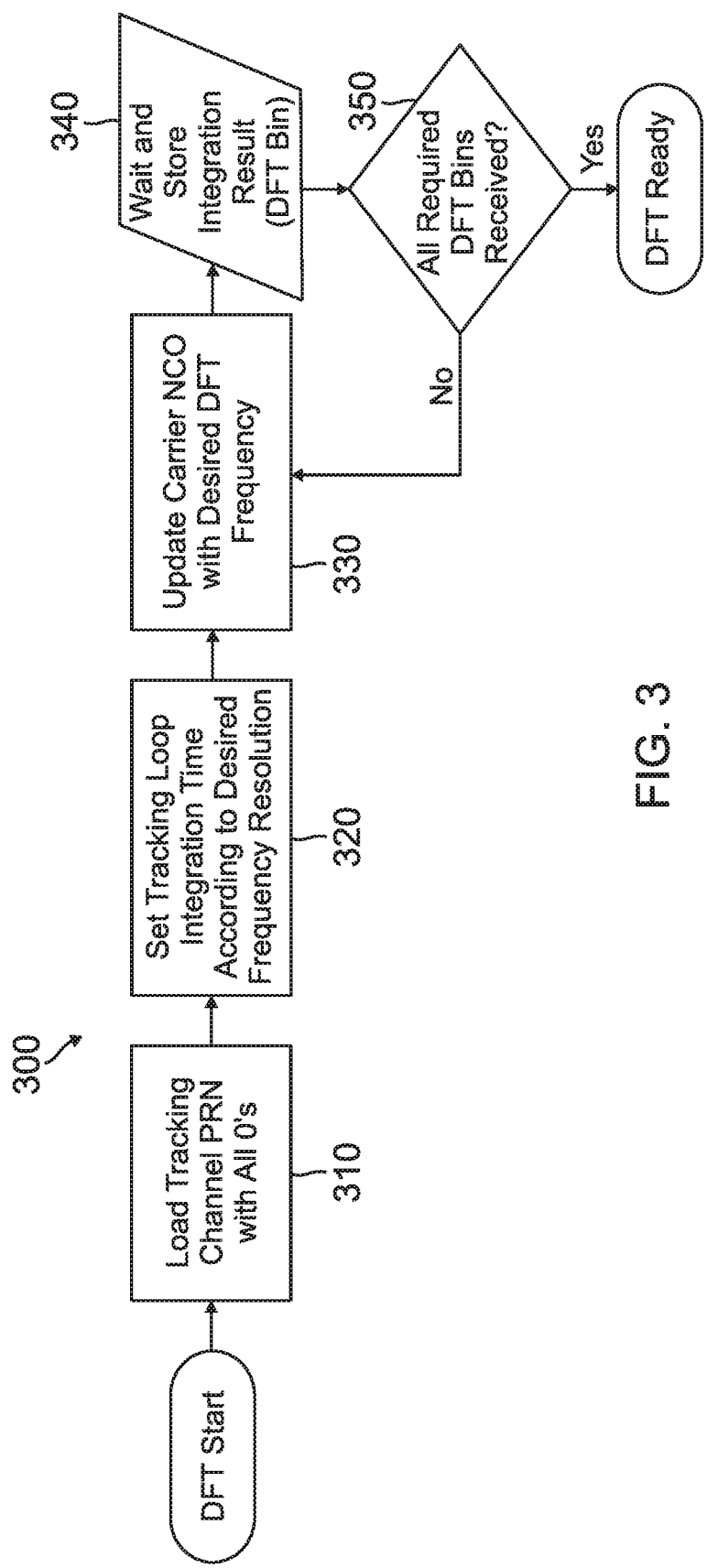
FIG. 3 is a flow diagram of a control method for performing a DFT on one or more data samples in a GNSS baseband tracking channel.

FIG. 3 is a flow diagram of a software control method 300 for performing a DFT on one or more data samples in a GNSS baseband tracking channel. The software needs only to control the integration time, which sets the desired frequency resolution, and the carrier generator such as a carrier NCO to produce the correct frequencies for a given DFT bin.

At the start of the DFT, method 300 loads a PRN code generator with a constant value, such as all zeros, in the baseband tracking channel (block 310), and sets a tracking loop integration time according to a selected frequency resolution (block 320). The method 300 then updates the carrier NCO with a desired DFT frequency in the baseband tracking channel (block 330). A data sample in the baseband tracking channel is integrated, and method 300 then waits and stores the integration result in a DFT bin (block 340). The method 300 then determines whether all DFT bins have been received (block 350). If all DFT bins have not been received, method 300 repeats starting at block 330 until all DFT bins have been received. The DFT is then ready for further processing.

Examples of DFT calculation times for different frequency resolutions are listed in Table 1. In particular, Table 1 shows the integration time required to calculate one DFT at a given frequency resolution. For the calculations, it is assumed that the RF-FE sampling frequency is 50 MHz, and that the input signal is real. For the real input signal, the total number of bins can be divided by 2 due to the symmetric frequency spectrum.

TABLE 1

| Frequency Resolution | Integration Time | Transform Length | Frequency Bins | Full Spectrum Calculation Time |
|---|---|---|---|---|
| 100 kHz | 0.01 ms | 500 | 250 | 2.5 ms |
| 10 kHz | 0.1 ms | 5000 | 2500 | 0.25 s |
| 1 kHz | 1 ms | 50000 | 25000 | 25 s |

A processor used in the present method and system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method of performing a discrete Fourier transform (DFT) on one or more data samples in a GNSS baseband tracking channel, the method comprising: (a) loading a pseudorandom noise code generator with a constant value in the baseband tracking channel; (b) setting a tracking loop integration time according to a selected frequency resolution; (c) updating a carrier generator with a selected DFT frequency in the baseband tracking channel; (d) integrating a data sample in the baseband tracking channel; (e) storing the integrated data sample in a DFT bin; (f) determining whether all DFT bins have been received; and (g) if all DFT bins have not been received, repeating the method starting at step (c) until all DFT bins have been received.

Example 2 includes the method of Example 1, wherein the carrier generator comprises a carrier numerically controlled oscillator (NCO).

Example 3 includes the method of Example 2, wherein the data sample is a combined signal comprising a digital input sample from a radio frequency front end of a GNSS receiver and an output signal from the carrier NCO.

Example 4 includes the method of any of Examples 1-3, wherein the DFT bins are defined by the following equation:

$$F_n \equiv \sum_{k=0}^{N-1} f_k e^{-\frac{2\pi i n k}{N}}$$

where n is the number of the DFT bin, k is the number of the input sample, $F_n$ is the result of the $n^{th}$ DFT bin, $f_k$ is the $k^{th}$ input sample, and N is the transform length.

Example 5 includes the method of any of Examples 1-4, wherein the constant value is zero.

Example 6 includes the method of any of Examples 1-5, wherein the baseband tracking channel is implemented in a field programmable gate array or an application-specific integrated circuit.

Example 7 includes a computer program product comprising a non-transitory computer readable medium having processor executable instructions stored thereon for a method of performing a DFT on one or more data samples in a GNSS baseband tracking channel, the method comprising: (a) loading a pseudorandom noise code generator with a constant value in the baseband tracking channel; (b) setting a tracking loop integration time according to a selected frequency resolution; (c) updating a carrier generator numerically controlled oscillator with a selected DFT frequency in the baseband tracking channel; (d) integrating a data sample in the baseband tracking channel; (e) storing the integrated data sample in a DFT bin; (f) determining whether all DFT bins have been received; and (g) if all DFT bins have not been received, repeating the method starting at step (c) until all DFT bins have been received.

Example 8 includes the computer program product of Example 7, wherein the data sample is a combined signal comprising a digital input sample from a radio frequency front end of a GNSS receiver and an output signal from the carrier generator.

Example 9 includes the computer program product of any of Examples 7-8, wherein the DFT bins are defined by the following equation:

$$F_n \equiv \sum_{k=0}^{N-1} f_k e^{-2\pi i n k/N}$$

where n is the number of the DFT bin, k is the number of the input sample, $F_n$ is the result of the $n^{th}$ DFT bin, $f_k$ is the $k^{th}$ input sample, and N is the transform length.

Example 10 includes the computer program product of any of Examples 7-9, wherein the constant value is zero.

Example 11 includes a system for performing a DFT on one or more data samples, the system comprising: a baseband tracking channel of a GNSS receiver, the baseband tracking channel comprising: a carrier generator; a carrier wipeoff configured to receive an output signal from the carrier generator and an input digital sample from a radio frequency front end of the GNSS receiver; a code wipeoff configured to receive a combined signal output from the carrier wipeoff; a code generator configured to send a pseudorandom noise (PRN) code to the code wipeoff; an integrate and dump accumulator configured to receive the combined signal from the code wipeoff and integrate the combined signal to generate a DFT point; and a tracking control software module comprising a non-transitory processor readable medium having processor executable instructions stored thereon to perform the DFT by a process comprising: (a) loading a PRN code of a constant value into the code generator; (b) setting a tracking loop integration time according to a selected frequency resolution; (c) loading the carrier generator with a selected DFT frequency; (d) collecting the DFT point from the integrate and dump accumulator; (e) storing the collected DFT point in a DFT bin; and (f) repeating the process starting at (c) until all desired DFT points are collected and stored in respective DFT bins.

Example 12 includes the system of Example 11, wherein the carrier generator comprises a carrier numerically controlled oscillator.

Example 13 includes the system of any of Examples 11-12, wherein the carrier wipeoff comprises a first mixer that combines the output signal from the carrier generator and the input digital sample, and sends the combined signal to the code wipeoff.

Example 14 includes the system of Example 13, wherein the code wipeoff comprises a second mixer that receives the PRN code from the code generator, and sends the combined signal to the integrate and dump accumulator.

Example 15 includes the system of any of Examples 11-14, wherein the DFT bins are defined by the following equation:

$$F_n \equiv \sum_{k=0}^{N-1} f_k e^{-2\pi i n k/N}$$

where n is the number of the DFT bin, k is the number of the input sample, $F_n$ is the result of the $n^{th}$ DFT bin, $f_k$ is the $k^{th}$ input sample, and N is the transform length.

Example 16 includes the system of any of Examples 11-15, wherein the baseband tracking channel is implemented in a field programmable gate array or an application-specific integrated circuit.

Example 17 includes the system of any of Examples 11-16, wherein the baseband tracking channel further comprises a carrier loop filter operatively coupled with the carrier generator, and a carrier discriminator operatively coupled with the carrier loop filter.

Example 18 includes the system of Example 17, wherein the carrier discriminator is further operatively coupled with the integrate and dump accumulator.

Example 19 includes the system of any of Examples 11-18, wherein the baseband tracking channel further comprises a code loop filter operatively coupled with the code generator, and a code discriminator operatively coupled with the code loop filter.

Example 20 includes the system of any of Examples 11-19, wherein the constant value is zero.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of performing a discrete Fourier transform (DFT) on one or more data samples in a global navigation satellite system (GNSS) baseband tracking channel, the method comprising:

loading a carrier generator with a selected DFT frequency;

receiving, in a carrier wipeoff, an output signal from the carrier generator, and a digital sample based on a data sample of the one or more data samples from a radio frequency front end of a GNSS receiver;

receiving, in a code wipeoff, a first combined signal from the carrier wipeoff and a pseudorandom noise (PRN) code of a constant value;

receiving, in an accumulator, a second combined signal output from the code wipeoff that is used to generate a DFT point;

collecting the DFT point generated by the accumulator;

storing the collected DFT point as a DFT bin; and repeating the method until all desired DFT points are collected and stored as respective DFT bins.

2. The method of claim 1, wherein the carrier generator comprises a carrier numerically controlled oscillator (NCO).

3. The method of claim 1, wherein the DFT bins are defined by the following equation:

$$F_n \equiv \sum_{k=0}^{N-1} f_k e^{-2\pi i n k/N}$$

where n is the number of the DFT bin, k is the number of the input sample, $F_n$ is the result of the $n^{th}$ DFT bin, $f_k$ is the $k^{th}$ input sample, and N is the transform length.

4. The method of claim 1, wherein the constant value is zero.

5. The method of claim 1, wherein the baseband tracking channel is implemented in a field programmable gate array or an application-specific integrated circuit.

6. A computer program product, comprising:

a non-transitory computer readable medium having processor executable instructions stored thereon for a method of performing a discrete Fourier transform (DFT) on one or more data samples in a global navigation satellite system (GNSS) baseband tracking channel, the method comprising:

(a) loading a pseudorandom noise code generator with a constant value in the baseband tracking channel;

(b) setting a tracking loop integration time according to a selected frequency resolution;

(c) updating a carrier generator with a selected DFT frequency in the baseband tracking channel;

(d) integrating a data sample from the one or more data samples in the baseband tracking channel to generate a DFT point;

(e) storing the DFT point as a DFT bin;

(f) determining whether all DFT points have been generated; and (g) if all DFT points have not been generated, repeating the method starting at step (c) until all DFT points have been generated.

7. The computer program product of claim 6, wherein the data sample is a combined signal comprising a digital input sample from a radio frequency front end of a GNSS receiver and an output signal from the carrier generator.

8. The computer program product of claim 6, wherein the DFT bin is defined by the following equation:

$$F_n \equiv \sum_{k=0}^{N-1} f_k e^{-2\pi i n k/N}$$

where n is the number of the DFT bin, k is the number of the input sample, $F_n$ is the result of the $n^{th}$ DFT bin, $f_k$ is the $k^{th}$ input sample, and N is the transform length.

9. The computer program product of claim 6, wherein the constant value is zero.

10. A system for performing a discrete Fourier transform (DFT) on one or more data samples, the system comprising:

a baseband tracking channel of a global navigation satellite system (GNSS) receiver, the baseband tracking channel comprising:

a carrier generator;

a carrier wipeoff in operative communication with the carrier generator;

a code wipeoff in operative communication with the carrier wipeoff;

a code generator configured to send a pseudorandom noise (PRN) code of a constant value to the code wipeoff; and an accumulator in operative communication with the code wipeoff; and a tracking control software module comprising a non-transitory processor readable medium having processor executable instructions stored thereon to perform the DFT by a process comprising:

loading the carrier generator with a selected DFT frequency;

receiving, in the carrier wipeoff, an output signal from the carrier generator, and a digital sample based on a data sample of the one or more data samples from a radio frequency front end of a GNSS receiver;

receiving, in the code wipeoff, a first combined signal from the carrier wipeoff and the PRN code from the code generator;

receiving, in the accumulator, a second combined signal from the code wipeoff that is used to generate a DFT point;

collecting the DFT point generated by the accumulator;

storing the collected DFT point as a DFT bin; and repeating the process until all desired DFT points are collected and stored as respective DFT bins.

11. The system of claim 10, wherein the carrier generator comprises a carrier numerically controlled oscillator.

12. The system of claim 10, wherein the carrier wipeoff comprises a first mixer that combines the output signal from the carrier generator and the digital sample to produce the first combined signal, and sends the first combined signal to the code wipeoff.

13. The system of claim 12, wherein the code wipeoff comprises a second mixer that receives the first combined signal from the carrier wipeoff and the PRN code from the code generator to produce the second combined signal, and sends the second combined signal to the accumulator.

14. The system of claim 10, wherein the DFT bins are defined by the following equation:

$$F_n \equiv \sum_{k=0}^{N-1} f_k e^{-2\pi i n k/N}$$

where n is the number of the DFT bin, k is the number of the input sample, $F_n$ is the result of the $n^{th}$ DFT bin, $f_k$ is the $k^{th}$ input sample, and N is the transform length.

15. The system of claim 10, wherein the baseband tracking channel is implemented in a field programmable gate array or an application-specific integrated circuit.

16. The system of claim 10, wherein the baseband tracking channel further comprises a carrier loop filter operatively coupled with the carrier generator, and a carrier discriminator operatively coupled with the carrier loop filter.

17. The system of claim 16, wherein the carrier discriminator is further operatively coupled with the accumulator.

18. The system of claim 17, wherein the baseband tracking channel further comprises a code loop filter operatively coupled with the code generator, and a code discriminator operatively coupled with the code loop filter.

19. The system of claim 10, wherein the constant value is zero.

* * * * *